United States Patent
Salter et al.

(10) Patent No.: US 9,827,903 B1
(45) Date of Patent: Nov. 28, 2017

(54) ILLUMINATED TRIM PANEL

(71) Applicant: Ford Global Technologies, LLC, Dearborn, MI (US)

(72) Inventors: Stuart C. Salter, White Lake, MI (US); Jeffrey Singer, Plymonth, MI (US); James J. Surman, Clinton Township, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/240,071

(22) Filed: Aug. 18, 2016

(51) Int. Cl.
*B60Q 1/26* (2006.01)
*B60Q 3/02* (2006.01)
*B60R 13/02* (2006.01)
*B60Q 3/00* (2017.01)

(52) U.S. Cl.
CPC ........... *B60Q 3/0216* (2013.01); *B60Q 3/002* (2013.01); *B60Q 3/008* (2013.01); *B60R 13/0243* (2013.01); *B60Q 2500/10* (2013.01); *B60R 2013/0287* (2013.01)

(58) Field of Classification Search
CPC . B60Q 3/00; B60Q 3/20; B60Q 3/217; B60Q 3/267; B60Q 3/60; B60Q 3/62; B60Q 3/64; B60Q 3/66; B60Q 3/68; B60Q 3/78; B60Q 2500/00; B60Q 2500/10; B60R 13/0243
USPC ......... 362/487–488, 501, 503–504, 509–511
See application file for complete search history.

(56) References Cited

U.S. PATENT DOCUMENTS

| | | |
|---|---|---|
| 2,486,859 A | 11/1949 | Meijer et al. |
| 5,053,930 A | 10/1991 | Benavides |
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Jason Moon Han
(74) *Attorney, Agent, or Firm* — Vichit Chea; Price Heneveld LLP

(57) ABSTRACT

A light system for a vehicle is provided herein. The light system includes a trim panel having an upper portion disposed proximately to an opening. A light guide is coupled to the panel. The light guide has an upper portion disposed between the trim panel and the opening and is configured to direct an excitation light therethrough. A light transmissive member is operably coupled with the light guide having a photoluminescent structure configured to convert an excitation light into a converted light. The converted light is directed towards a trim panel feature.

20 Claims, 7 Drawing Sheets

(56) References Cited

U.S. PATENT DOCUMENTS

| | | |
|---|---|---|
| 6,990,922 B2 | 1/2006 | Ichikawa et al. |
| 7,015,893 B2 | 3/2006 | Li et al. |
| 7,133,206 B2 | 11/2006 | Shibukawa et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,120,236 B2 | 2/2012 | Auday et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,641,250 B2 | 2/2014 | Smith |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,022,631 B2 | 5/2015 | Mulder et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formosa |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0016506 A1 | 1/2016 | Collins et al. |
| 2016/0102819 A1 | 4/2016 | Misawa et al. |
| 2016/0236613 A1 | 8/2016 | Trier |
| 2017/0158125 A1 | 6/2017 | Schuett et al. |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

ILLUMINATED TRIM PANEL

FIELD OF THE INVENTION

The present disclosure generally relates to vehicle light systems, and more particularly, to vehicle light systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a light system for a vehicle is disclosed. The light system includes a trim panel having an upper portion disposed proximately to a window. A light guide is coupled to the trim panel. The light guide has an upper portion disposed between the trim panel and the window and is configured to direct an excitation light therethrough. A light transmissive member is operably coupled with the light guide and has a photoluminescent structure configured to convert an excitation light into a converted light. The converted light is directed towards a trim panel feature.

According to another aspect of the present invention, a light system for a vehicle is disclosed. The light system includes a light guide coupled to a panel. An upper portion of the light guide is disposed between the panel and a window and is configured to accept UV light therethrough. A first photoluminescent structure is disposed on a light transmissive member. The first photoluminescent structure is configured to luminesce in response to excitation by UV light that is directed through the light guide and towards the light transmissive member.

According to yet another aspect of the present invention, a light system for a vehicle is disclosed. The light system includes a panel having a light transmissive member therein. A light guide is attached to the panel. The light guide has an upper portion disposed between the panel and a window. A first photoluminescent structure is disposed within the light transmissive member and is configured to luminesce in response to receiving an excitation light.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
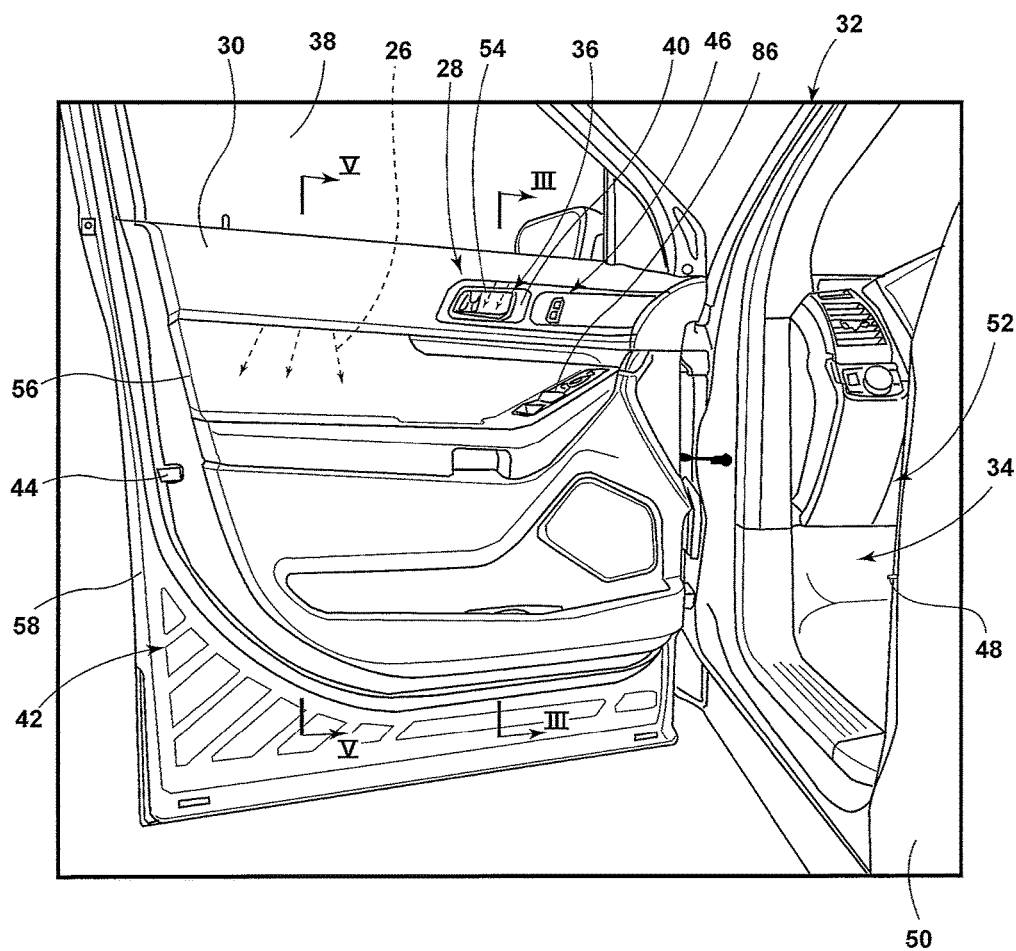
FIG. 2 is a perspective view of a vehicle door in the open position having a light system incorporated therein, according to one embodiment.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a light system for a vehicle. The light system may advantageously employ one or more photoluminescent structures that are configured to illuminate in response to receiving excitation light. In some embodiments, the excitation light may be environmental excitation light, such as light emitted by the sun.

Figure 1A:
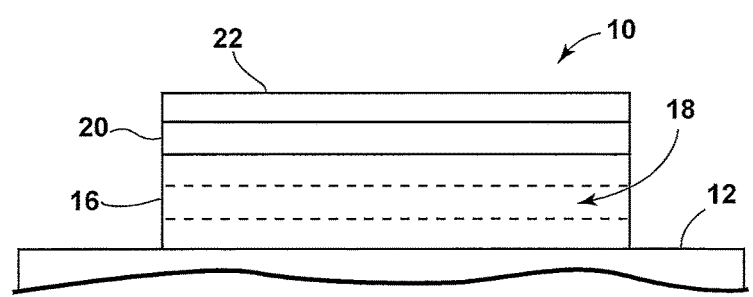
FIG. 1A is a side view of a photoluminescent structure rendered as a coating for use in a photoluminescent latch assembly according to one embodiment.
Figure 1B:
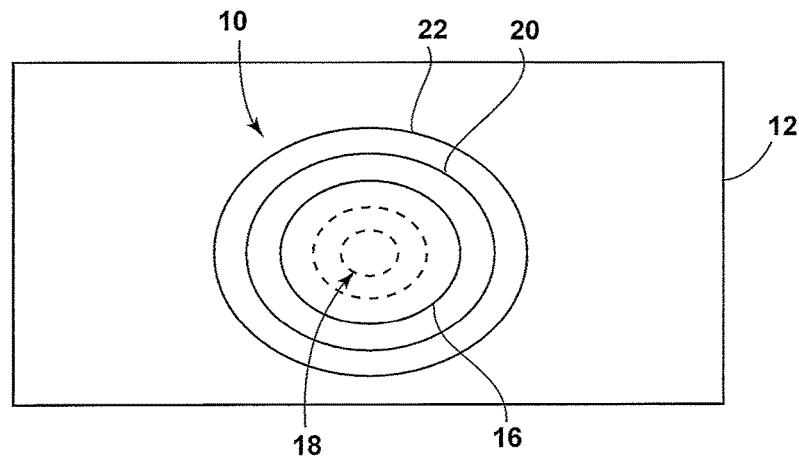
FIG. 1B is a top view of a photoluminescent structure rendered as a discrete particle according to one embodiment.
Figure 1C:
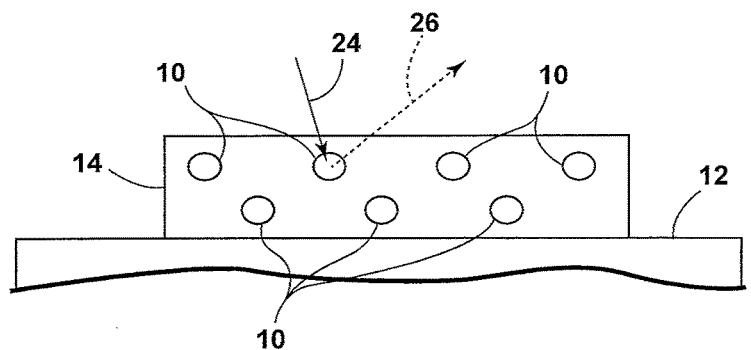
FIG. 1C is a side view of a plurality photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials 18 having energy converting elements with phosphorescent or fluorescent properties. Each photoluminescent material 18 may become excited upon receiving an excitation light 24 of a specific wavelength, thereby causing the light to undergo a conversion process. Under the principle of down conversion, the excitation light 24 is converted into a longer wavelength, converted light 26 that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by a light source, such as the sun, is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the photoluminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some embodiments, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principle driving mechanism for an energy conversion process corresponding to a change in wavelength of light. In the various embodiments discussed herein, each of the photoluminescent structures 10 may operate under either conversion principle.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION"; U.S. Pat. No. 8,664,624 B2 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Pat. No. 8,846,184 to Agrawal et al., entitled "CHROMIC LUMINESCENT OBJECTS," all of which are incorporated herein by reference in their entirety.

According to one embodiment, the photoluminescent material 18 may include organic or inorganic fluorescent dyes including rylenes, xanthenes, porphyrins, and phthalocyanines. Additionally, or alternatively, the photoluminescent material 18 may include phosphors from the group of Ce-doped garnets such as YAG:Ce and may be a short persistence photoluminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the photoluminescent structure 10 drops below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 18 with ultra-short persistence characteristics, which can emit the converted light 26 by absorbing purple to blue excitation light 24 emitted from a light source. According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 18, according to one embodiment, disposed within the photoluminescent structure 10 may include a long persistence photoluminescent material 18 that emits the converted light 26, once charged by the excitation light 24. The excitation light 24 may be emitted from any excitation source (e.g., any natural light source, such as the sun, and/or any artificial light source). The long persistence photoluminescent material 18 may be defined as having a long decay time due to its ability to store the excitation light 24 and release the converted light 26 gradually, for a period of several minutes or hours, once the excitation light 24 is no longer present.

The long persistence photoluminescent material 18, according to one embodiment, may be operable to emit light at or above an intensity of 0.32 mcd/m² after a period of 10 minutes. Additionally, the long persistence photoluminescent material 18 may be operable to emit light above or at an intensity of 0.32 mcd/m² after a period of 30 minutes and, in some embodiments, for a period substantially longer than 60 minutes (e.g., the period may extend 24 hours or longer, and in some instances, the period may extend 48 hours). Accordingly, the long persistence photoluminescent material 18 may continually illuminate in response to excitation from any light sources that emits the excitation light 24, including, but not limited to, natural light sources (e.g., the sun) and/or any artificial light source. The periodic absorption of the excitation light 24 from any excitation source may provide for a substantially sustained charge of the long persistence photoluminescent material 18 to provide for consistent passive illumination. In some embodiments, a light sensor may monitor the illumination intensity of the photoluminescent structure 10 and actuate an excitation source when the illumination intensity falls below 0.32 mcd/m², or any other predefined intensity level.

The long persistence photoluminescent material 18 may correspond to alkaline earth aluminates and silicates, for example doped di-silicates, or any other compound that is capable of emitting light for a period of time once the excitation light 24 is no longer present. The long persistence photoluminescent material 18 may be doped with one or more ions, which may correspond to rare earth elements, for example, $Eu^{2+}$, $Tb^{3+}$ and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one embodiment, a blue emitting phosphorescent material may have the structure $Li_2ZnGeO_4$ and may be prepared by a high temperature solid-state reaction method or through any other practicable method and/or process. The afterglow may last for a duration of 2-8 hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSIS- TENT LUMINESCENCE," all of which are incorporated herein by reference in their entirety.

Referring to FIG. 2, a panel light system 28 that is disposed within a panel 30 of a vehicle 32 that is configured to illuminate a desired location within an interior 34 of the vehicle 32 is illustrated, according to one embodiment. The panel 30 may be configured as a trim panel that conceals a door structure 42 of the vehicle 32. The light system 28 may provide accent and/or feature lighting and may be disposed proximate to one or more vehicle features 36, such as an armrest 56 or a release handle 40 disposed within the vehicle 32.

The door structure 42 is secured in its closed position by a latch 44 of a suitable conventional type that may include a power lock mechanism 46. The latch 44 is mounted on the rear edge of the door structure 42 and engages a striker 48 that is mounted on a vehicle body 50 in the rear edge of a door opening 52. The latch 44 is manually operated by the release handle 40 that pivots in a recessed mounting plate 54 that is mounted in an opening in the trim panel 30 above the armrest 56. The release handle 40 is connected to release the latch 44 by linkage of a suitable conventional type that is mounted between the trim panel 30 and an outer panel 58.

Figure 3:
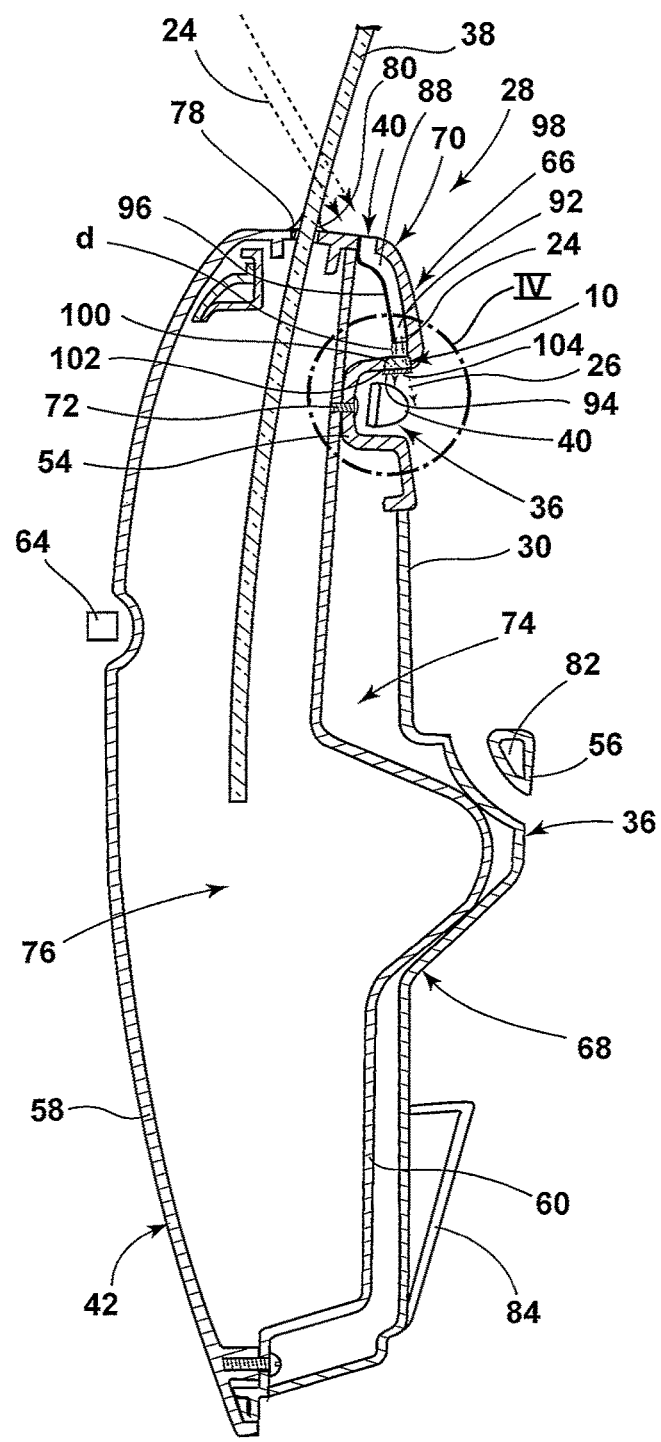
FIG. 3 is a cross-sectional view of the door taken along the line of FIG. 2 illustrating the light system, according to one embodiment, having a light guide attached to an inner surface of a trim panel.

Referring to FIG. 3, a cross-sectional view taken along the line of FIG. 2 illustrates the trim panel 30 employing the light system 28. The door structure 42 includes the outer panel 58 and an inner panel 60 which are assembled and connected together at peripheral portions. The inner panel 60 may be a metallic material, or alternatively, the inner panel 60 may be a non-metallic material, such as a carbon fiber composite, carbon fiber reinforced polymer, or a polymeric material. The inner panel 60 may be molded into a predetermined shape using conventional molding processes. In addition, the inner panel 60 may be a single piece or assembled from multiple pieces.

The outer panel 58 may be a metallic material, such as aluminum, steel, titanium, and/or any other practicable material known in the art. In one embodiment, the outer panel 58 may be made from any suitable manufacturing process such as stamping. In addition, the outer panel 58 may be assembled from multiple parts that are connected to each other using adhesives, rivets, welding, or the like. The outer panel 58 may also include a cavity 62 that provides access to an exterior handle 64 that is coupled with the latch 44 to open the door structure 42 from an exterior side. Additional components of the vehicle 32 may be disposed between the outer and inner panels 58, 60, such as, but not limited to the window 38 and additional wiring for electrical components disposed within the interior 34 of the vehicle 32.

The trim panel 30 may be of one-piece construction or an assembly of panel sections, including an upper section 66 and a lower section 68 that extends to the bottom edge of the door structure 42. The upper section 66 includes a rollover section 70 on the top portion wherein the upper section 66 curves from a horizontally extending direction to a more vertically oriented direction. The trim panel 30 is attached to the inner panel 60 with fasteners 72 of a suitable conventional type. The trim panel 30 and the inner panel 60 also define a space 74 therebetween adjacent a space 76 between the outer and inner door panels 58, 60. Outer and inner window seals 78, 80 provide sealing between the window 38 and the respective outer and inner door panels 58, 60.

In the embodiment shown in FIG. 3, the trim panel 30 includes the armrest 56 that defines a bar 82 that may be used for moving the vehicle door structure 42 between different positions, such as an open position and a closed position.

The trim panel 30 may also include additional trim panel features 36, such as a door side pocket 84, control switch for a window lifter 86 (FIG. 2), control switch for the lock mechanism 46 (FIG. 2), etc., each of which may be operably coupled with the light system 28 provided herein.

A light guide 88 may be attached to the trim panel 30. The light guide 88 may include an upper portion 90 that is disposed proximately to the rollover section 70 and a window 38. Accordingly, the light guide 88 may accept environmental excitation light 24, such as sunlight, through the upper portion 90 thereof and direct the excitation light 24 through the light guide 88. A bottom portion 92 of the light guide 88 terminates proximately to, and/or operably coupled with, a light transmissive member 94 that incorporates the photoluminescent structure therein. In response to receiving the excitation light 24, the photoluminescent structure luminesces thereby directing converted light 26 towards a feature 36 of the trim panel 30, such as the release handle 40. In some embodiments, the bottom portion 92 of the light guide 88 may incorporate optics to further direct the excitation light 24 towards a desired location.

The light guide 88 may be a substantially transparent or translucent guide suitable for transmitting light (e.g., excitation light 24). The light guide 88 may be formed from a rigid material that is comprised of a curable substrate such as a polymerizable compound, a mold in clear (MIC) material or mixtures thereof. Acrylates are also commonly used for forming rigid light pipes, as well as poly methyl methacrylate (PMMA), which is a known substitute for glass. A polycarbonate material may also be used in an injection molding process to form the rigid light guide 88.

Further, the light guide 88 may be a flexible light guide, wherein a suitable flexible material is used to create the light guide 88. Such flexible materials include urethanes, silicone, thermoplastic polyurethane (TPU), or other like optical grade flexible materials. Whether the light guide 88 is flexible or rigid, the light guide 88, when formed, is substantially optically transparent and/or translucent and capable of transmitting light. The light guide 88 may be referred to as a light pipe, a light plate, a light bar or any other light carrying or transmitting substrate made from a clear or substantially translucent material. Known methods of attaching the light guide 88 to the trim panel 30 include bonding of a preformed light guide 88 within the light system 28 by adhesion, such as by using a double-sided tape, or by mechanical connections, such as brackets.

Figure 4:
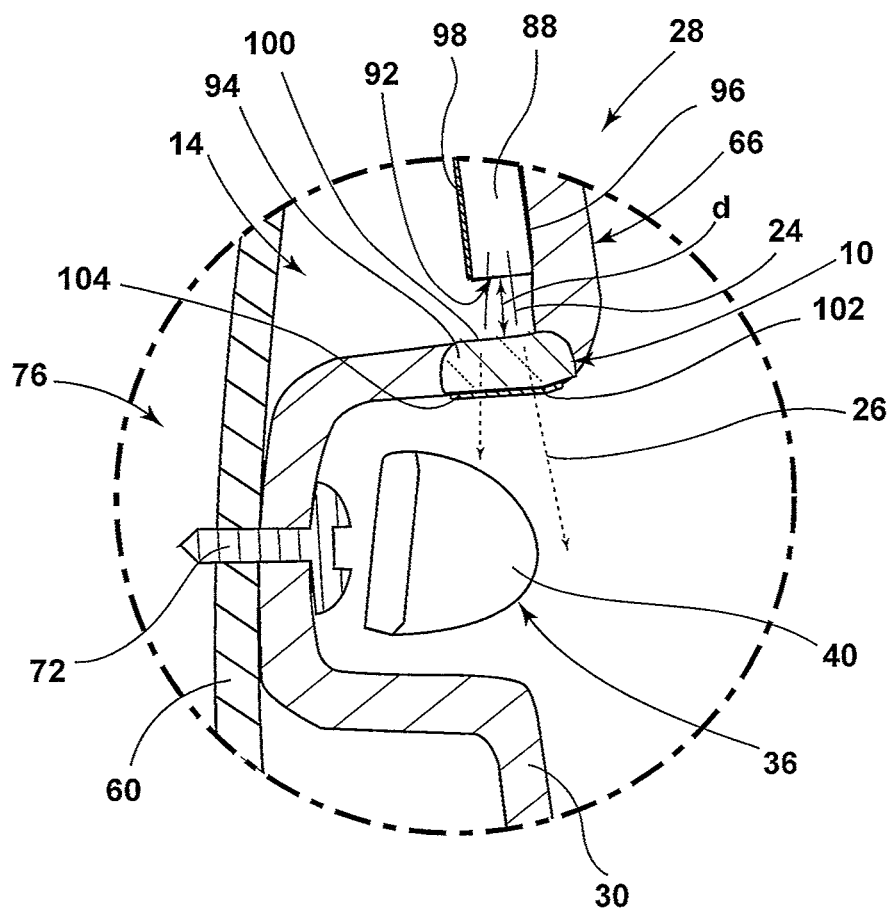
FIG. 4 is an enhanced view of section IV of FIG. 3, according to one embodiment.

Referring to FIG. 4, as discussed above, the light guide 88 is attached to an interior surface 96 of the trim panel 30. A reflective material 98 may be disposed on portions of the light guide 88 such that excitation light 24 directed through the light guide 88 may substantially exit a desired portion of the light guide 88. The reflective material 98 may be an additional layer of material, such as paint, that is adhered to the desired portions of the light guide 88. Accordingly, a substantial portion of excitation light 24 that is directed through the light guide 88 may be converted by the photoluminescent structure 10 to converted light 26 that exits the light system 28 through the light transmissive member 94 in an evenly distributed manner.

In some embodiments, the trim panel 30, the light guide 88, and/or the light transmissive member 94 may be integrally formed through a multi-shot molding process. Due to fabrication and assembly steps being performed inside the molds, molded multi-material objects allow significant reduction in assembly operations and production cycle times. Furthermore, the product quality can be improved, and the possibility of manufacturing defects, and total manufacturing costs can be reduced. In multi-material injection molding, multiple different materials are injected into a multi-stage mold. The sections of the mold that are not to be filled during a molding stage are temporally blocked. After the first injected material sets, then one or more blocked portions of the mold are opened and the next material is injected. This process continues until the required multi-material part is created.

According to one embodiment, a multi-shot molding process is used to create portions of the light guide 88, which may be integrally formed with the trim panel 30. Additional optics may also be molded into the light guide 88 during the multi-material injection molding process. Initially, the trim panel 30 may be formed through a first injection molding step, or through successive steps, if necessary. Next, the light guide 88 is then molded and coupled to the trim panel 30 in a subsequent injection molding step. The light transmissive member 94 may also be disposed on a portion of the trim panel 30 prior to, contemporaneously with, or subsequently to, the integral attachment of the light guide 88 to the trim panel 30.

As illustrated in FIG. 4, the upper section 66 and the lower section 68 of the trim panel 30 are laterally offset from one another. The light transmissive member 94 may be attached to the upper section 66 and/or lower section 68 of the trim panel 30. The light transmissive member 94 may be integrally formed with the trim panel 30, or later attached thereto, through any means known in the art. As excitation light 24 is outputted from the bottom portion 92 of the light guide 88, the excitation light 24 is directed towards the light transmissive member 94. The excitation light 24 is then transmitted through a first surface 100 and towards an opposing second surface 102 of the light transmissive member 94. As the excitation light 24 is transmitted through the light transmissive member 94, the photoluminescent structure thereon luminesces. In some embodiments, the light transmissive member 94 is separated from the bottom portion 92 of the light guide 88 by a distance d such that excitation light 24 and/or converted light 26 feedback through the light guide 88 may be reduced.

In operation, the photoluminescent structure 10, disposed on and/or within the light transmissive member 94, is formulated to become excited upon receiving excitation light 24 of a specific wavelength from the environmental light that is directed through the light guide 88. As a result, the excitation light 24 undergoes an energy conversion process and is re-emitted at a different wavelength. According to one embodiment, the photoluminescent material 18 may be formulated to convert excitation light 24 into a longer wavelength light, otherwise known as down conversion. Alternatively, the photoluminescent material 18 may be formulated to convert excitation light 24 into a shorter wavelength light, otherwise known as up conversion. Under either approach, light converted by the photoluminescent material 18 may be outputted from the photoluminescent structure 10 or otherwise used in an energy cascade, wherein the converted light 26 serves as excitation light 24 to excite another formulation of photoluminescent material 18 located within the energy conversion layer 16, whereby the subsequent converted light 26 may then be outputted from the photoluminescent structure 10 or used as excitation light 24, and so on. With respect to the energy conversion processes described herein, the difference in wavelength between the excitation light 24 and the converted light 26 is known as the Stokes shift and serves as the principle driving mechanism for an energy conversion process corresponding to a change in wavelength of light.

Moreover, according to one embodiment, a long-persistence photoluminescent material 18 may be disposed within the photoluminescent structure 10 such that the light transmissive member 94 continues to emit light for long periods of time once excitation light 24 is no longer present. As discussed above, the long persistence photoluminescent material 18, according to one embodiment, may be operable to emit light at or above an intensity of $0.32$ mcd/m$^2$ after a period of 10 minutes. Additionally, the long persistence photoluminescent material 18 may be operable to emit light above or at an intensity of $0.32$ mcd/m$^2$ after a period of 30 minutes and, in some embodiments, for a period substantially longer than 60 minutes (e.g., the period may extend 24 hours or longer, and in some instances, the period may extend 48 hours). The periodic absorption of the excitation light 24 from any excitation source may provide for a substantially sustained charge of the long persistence photoluminescent material 18 to provide for consistent passive illumination.

In some embodiments, a decorative layer 104 may be disposed on the second surface 102 of the light transmissive member 94. The decorative layer 104 may control or modify an appearance of the light transmissive member 94. For example, the decorative layer 104 may be configured to confer a metallic appearance through any method known in the art, including, but not limited to, sputter deposition, vacuum deposition (vacuum evaporation coating), electroplating, or printing on to the light transmissive member 94 by a computer printer after preparation of the desired pattern through a computer. The metallic appearance may be chosen from a wide range of reflective materials and/or colors, including, but not limited to, silver, chrome, copper, bronze, gold, or any other metallic surface. Additionally, an imitator of any metallic material may also be utilized without departing from the teachings provided herein.

In other embodiments, the decorative layer 104 may be tinted any color to complement the vehicle structure on which the trim panel 30 is to be received. In any event, the decorative layer 104 should be at least partially light transmissible such that the converted light 26 is not prevented from illuminating through the light transmissive member 94 whenever an energy conversion process is underway.

Likewise, the upper portion of the light guide 88, or any other portion of the light guide 88, may also have the decorative layer 104 applied thereto. For example, the upper portion of the light guide 88 may be tinted to match a similar color to that of the rollover section 70. Additionally, or alternatively, the decorative layer 104 may incorporate any grain pattern to further provide desired aesthetic features 36.

Figure 5:
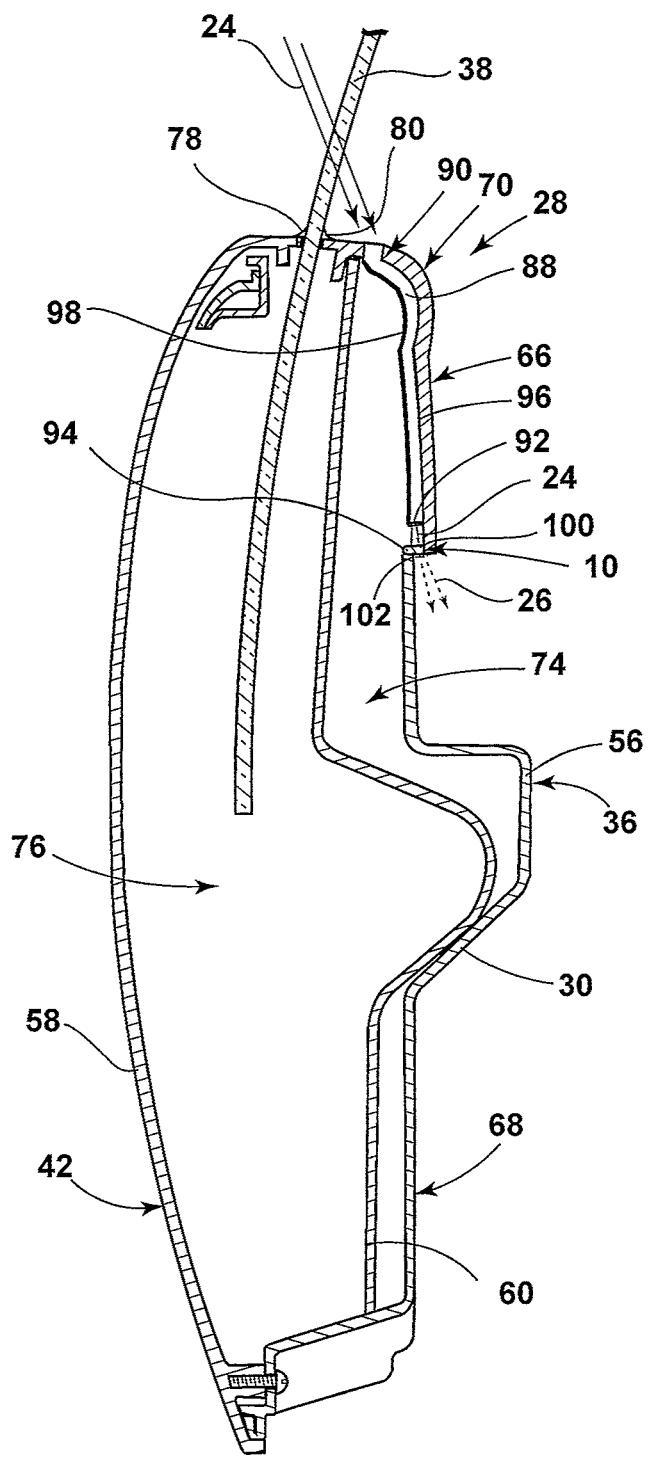
FIG. 5 is a cross-sectional view of the door taken along the line V-V of FIG. 2 illustrating the light system, according to one embodiment, having the light guide attached to the inner surface of the trim panel.

Referring to FIG. 5, as described above, the light guide 88 may be configured to illuminate a trim panel feature 36, such as the armrest 56. In some embodiments, individual features 36 may be illuminated in differing colors of converted light 26. For example, the release handle opening may be illuminated in a first color while the armrest 56, or lower trim section 68, may be illuminated in a second color. Accordingly, a plurality of light transmissive members 94 may each incorporate a unique photoluminescent structure therein and/or the light system 28 may include a single light transmissive member 94 having a plurality of portions that have varied photoluminescent structures there along.

As described herein, the color of the luminescence may be dependent on the particular photoluminescent materials 18 utilized in the photoluminescent structure 10. Additionally, a conversion capacity of the photoluminescent structure 10 may be dependent on a concentration of the photoluminescent material 18 utilized in the photoluminescent structure 10. By adjusting the concentration, types, and proportions of the photoluminescent materials 18 in the photoluminescent structure 10 discussed herein, the illumination assembly may be operable to generate a range of color hues of the converted light 26.

Figure 6:
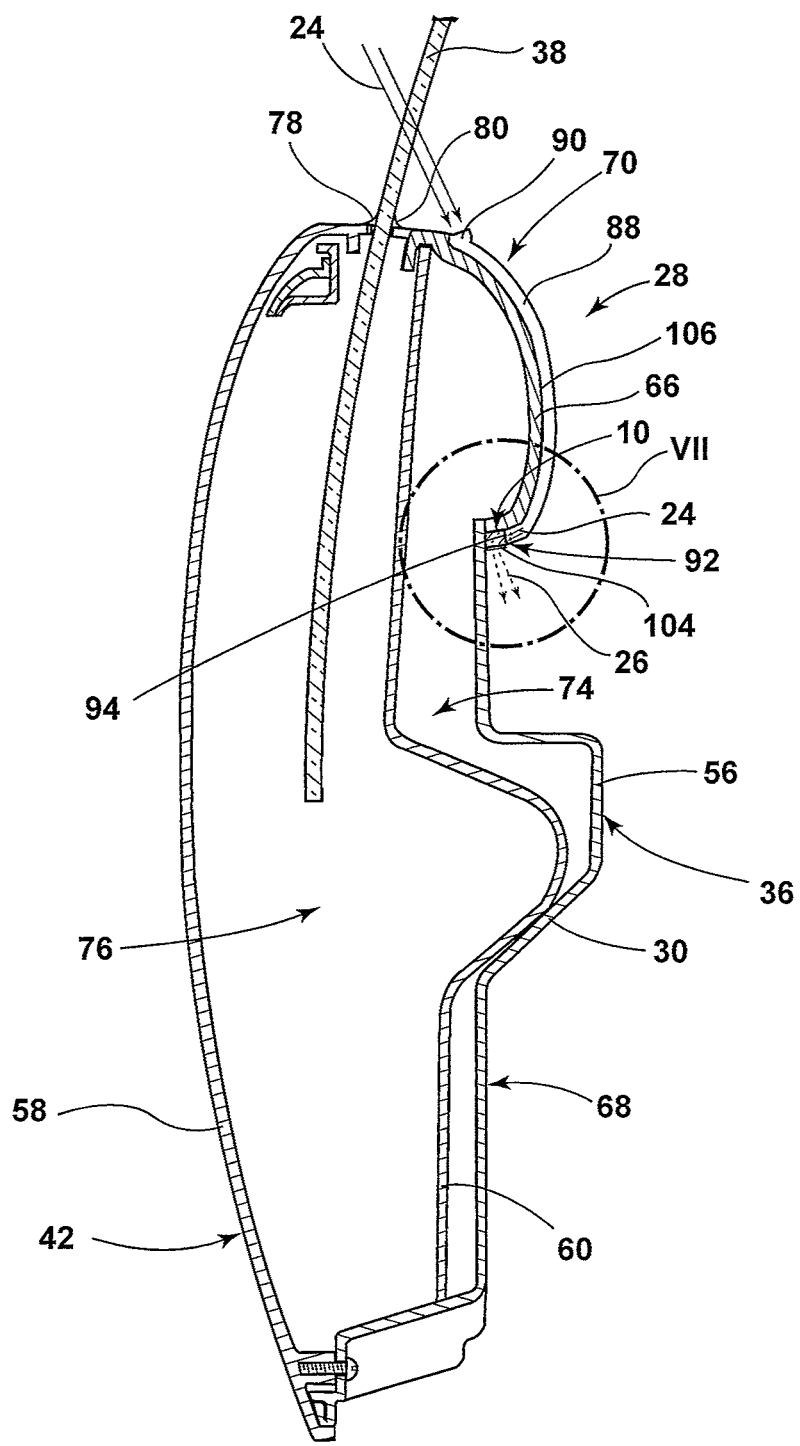
FIG. 6 is a cross-sectional view of the door taken along the line V-V of FIG. 2 illustrating the light system, according to an alternate embodiment, having the light guide attached to an outer surface of the trim panel.
Figure 7:
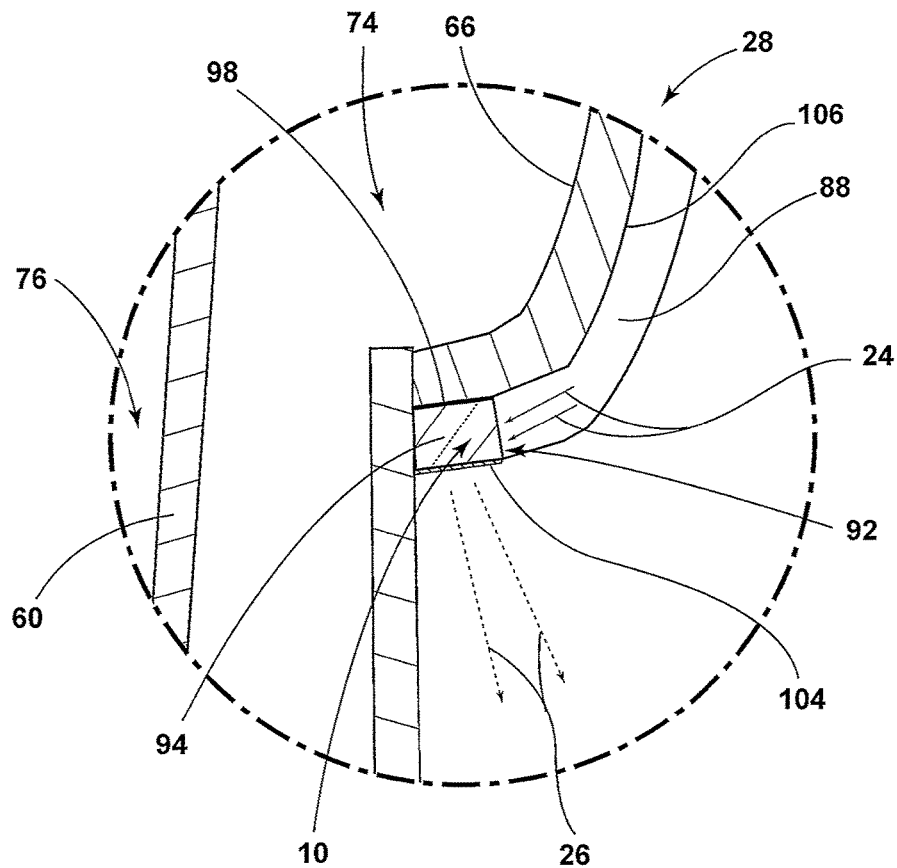
FIG. 7 is an enhanced view of section VII of FIG. 6, according to one embodiment.

Referring to FIGS. 6 and 7, the light guide 88 may be disposed on an outer surface 106 of the trim panel 30 and configured to direct light from a first location 108 proximately disposed to the window 38 to a second location 110 along the trim panel 30. As illustrated, the light guide 88, which may be translucent and/or transparent, may be visible to an occupant of the vehicle 32 and add the appearance of depth to the trim panel 30. The light guide 88 may direct light at the light transmissive member 94, which may include the photoluminescent structure therein and/or thereon. In other words, the light guide 88 may be operably coupled with the light transmissive member 94 such that excitation light 24 is directed towards the light transmissive member 94. The excitation light causes the photoluminescent structure to luminesce, which may be directed downwardly along the trim panel 30 and/or towards any feature 36 within the vehicle 32. The converted light 26 may be directed in the desired direction through the usage of optics. Additionally, or alternatively, the reflective material 98 may be disposed on the second side of the light transmissive member 94 and/or the upper surface of the light transmissive member 94.

In addition to directing excitation light towards the light transmissive member 94, the light guide 88 illustrated in FIGS. 6 and 7 may also provide protection for a desired surface finish that is provided on an outer surface 106 of the trim panel 30. The light guide 88 may be formed from any optically transparent and/or translucent material that may provide for a desired touch. For example, a material containing silicone may be used for providing a soft touch and scratch resistance to the trim panel 30. Accordingly, the light guide 88 may have viscoelasticity (i.e. having both viscosity and elasticity), a low Young's modulus, and/or a high failure strain so that the light guide 88 may be formed through various manufacturing processes, including, but not limited to, thermoforming, vacuum forming, and/or in-mold decorating.

Accordingly, a light system incorporated into a trim panel has been advantageously provided herein. The body panel retains its structural and protective properties while providing luminescent light having both functional and decorative characteristics.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited, to physically mateable and/or physically interacting components and/or wirelessly interactable and/or wirelessly interacting components and/or logically interacting and/or logically interactable components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A light system for a vehicle, comprising:
   a trim panel having an upper portion disposed proximately to a window of the vehicle;
   a light guide coupled to the trim panel, the light guide having an upper portion disposed between the trim panel and the window and configured to direct an excitation light from an outside environment therethrough; and
   a light transmissive member operably coupled with the light guide having a photoluminescent structure configured to convert an excitation light into a converted light, wherein the converted light is directed towards a trim panel feature.

2. The light system for a vehicle of claim 1, wherein the upper portion of the light guide includes a decorative layer thereon.

3. The light system for a vehicle of claim 2, wherein the window allows UV light to pass therethrough.

4. The light system for a vehicle of claim 1, wherein the photoluminescent structure comprises at least one photoluminescent material configured to convert an excitation light received from an environmental light source into a visible, converted light.

5. The light system for a vehicle of claim 1, wherein the light transmissive member is disposed between an upper trim panel and a lower trim panel, the upper trim panel being laterally offset from the lower trim panel.

6. The light system for a vehicle of claim 5, wherein the light transmissive member is separated from the light transmissive member.

7. The light system for a vehicle of claim 1, wherein the trim panel feature is configured as a release handle.

8. A light system for a vehicle, comprising:
   a light guide coupled to a door panel, wherein an upper portion of the light guide is disposed between the panel and a window and accepts UV light therethrough from an outside environment; and
   a first photoluminescent structure disposed on a light transmissive member and configured to luminesce in response to excitation by the UV light that is directed through the light guide.

9. The light system for a vehicle of claim 8, wherein the light transmissive member is configured as a lens that directs a converted light in a desired direction.

10. The light system for a vehicle of claim 9, wherein the converted light is directed towards a vehicle release handle.

11. The light system for a vehicle of claim 10, wherein a second photoluminescent structure is disposed on a vehicle feature and configured to luminesce in response to receiving UV light that is transmitted by the light guide.

12. The light system for a vehicle of claim 8, wherein the light guide includes a reflective material on a peripheral portion thereof.

13. The light system for a vehicle of claim 12, wherein the light guide is coupled to an outer surface of the panel and is configured to direct UV light into one side of the light transmissive member.

14. A light system for a vehicle, comprising:
   a door panel having a light transmissive member therein;
   a light guide attached to the panel, the light guide having an upper portion disposed between the panel and a window; and
   a first photoluminescent structure disposed on the light transmissive member and configured to luminesce in response to receiving an excitation light from an outside environment.

15. The light system for a vehicle of claim 14, wherein the first photoluminescent structure comprises at least one photoluminescent material configured to convert an excitation light received from an environmental light source into a visible, converted light.

16. The light system for a vehicle of claim 14, further comprising:
   a second photoluminescent structure disposed on the light transmissive member and configured to luminesce in a color different from that of the first photoluminescent structure.

17. The light system for a vehicle of claim 14, wherein a bottom surface of the light transmissive member includes a decorative layer thereon.

18. The light system for a vehicle of claim 14, wherein the light guide directs the excitation light through a side surface of the light transmissive member, the light transmissive member having a reflective material on a top surface thereof such that a converted light is directed through the opposing, bottom surface.

19. The light system for a vehicle of claim 14, wherein the light guide is attached to an outer surface of the panel and a decorative layer is disposed between the light guide and the panel.

20. The light system for a vehicle of claim 14, wherein the light guide is attached to an inner surface of the panel and configured to direct excitation light through a top surface of the light transmissive member and wherein the light transmissive member is separated from the light guide.

\* \* \* \* \*